United States Patent
Kim et al.

(10) Patent No.: US 9,549,394 B2
(45) Date of Patent: Jan. 17, 2017

(54) METHODS AND DEVICES FOR PERFORMING PROXIMITY DISCOVERY

(71) Applicant: BlackBerry Limited, Waterloo (CA)

(72) Inventors: Joon Beom Kim, Carrolton, TX (US); Noun Choi, Flower Mound, TX (US); Changhoi Koo, Plano, TX (US); Zhijun Cai, Ashburn, VA (US)

(73) Assignee: BlackBerry Limited, Waterloo, Ontario (CA)

( * ) Notice: Subject to any disclaimer, the term of this patent is extended or adjusted under 35 U.S.C. 154(b) by 400 days.

(21) Appl. No.: 14/194,211

(22) Filed: Feb. 28, 2014

(65) Prior Publication Data

US 2015/0249979 A1    Sep. 3, 2015

(51) Int. Cl.

| H04W 76/02 | (2009.01) |
|---|---|
| H04W 72/04 | (2009.01) |
| H04W 8/00 | (2009.01) |
| H04W 52/04 | (2009.01) |
| H04W 28/06 | (2009.01) |
| H04W 92/18 | (2009.01) |

(52) U.S. Cl.
CPC ......... *H04W 72/0413* (2013.01); *H04W 8/005* (2013.01); *H04W 52/04* (2013.01); *H04W 76/023* (2013.01); *H04W 28/06* (2013.01); *H04W 72/042* (2013.01); *H04W 72/0446* (2013.01); *H04W 72/0453* (2013.01); *H04W 76/021* (2013.01); *H04W 92/18* (2013.01)

(58) Field of Classification Search
CPC ... H04W 76/023; H04W 76/043; H04W 4/005
See application file for complete search history.

(56) References Cited

U.S. PATENT DOCUMENTS

| 2013/0343322 A1* | 12/2013 | Lee ...................... H04B 7/2656 370/329 |
|---|---|---|
| 2014/0003262 A1 | 1/2014 | He et al. |
| 2014/0378123 A1* | 12/2014 | Stojanovski ...... H04W 52/0251 455/422.1 |
| 2015/0071189 A1 | 3/2015 | Park et al. |
| 2015/0305075 A1* | 10/2015 | Fodor .................. H04W 8/005 370/329 |

(Continued)

FOREIGN PATENT DOCUMENTS

| WO | 2013025040 | 2/2013 |
|---|---|---|
| WO | 2014130154 | 8/2014 |

OTHER PUBLICATIONS

Gunes et al., "Hybrid Model for LTE Network-Assisted D2D Communications," Lecture Notes in Computer Science, Jan. 1, 2014, 8487:100-113.

(Continued)

*Primary Examiner* — Hoon J Chung
(74) *Attorney, Agent, or Firm* — Fish & Richardson P.C.

(57) ABSTRACT

A method for use in a first user equipment (UE) includes receiving, from a base station, control information and a resource assignment for uplink transmission; and transmitting, based on the control information, a discovery signal on the assigned resource for uplink transmission, the discovery signal including a first temporary UE identifier (ID) assigned to the first UE, wherein the first temporary UE ID is used to identify the first UE for device-to-device communication.

21 Claims, 11 Drawing Sheets

(56) References Cited

U.S. PATENT DOCUMENTS

| | | | | |
|---|---|---|---|---|
| 2015/0341772 A1* | 11/2015 | Liang | ................. | H04W 8/005 455/434 |
| 2016/0014589 A1* | 1/2016 | Niu | ................. | H04W 40/244 370/329 |
| 2016/0021526 A1* | 1/2016 | Niu | ................. | H04W 40/244 370/230 |
| 2016/0028518 A1* | 1/2016 | Zhao | ................. | H04L 1/0028 370/330 |

OTHER PUBLICATIONS

3GPP SA WG2 Meeting #101bis, S2-140603, "Discovery for Public Safety," San Jose Del Cabo, Mexico, Feb. 17, 2014, 17 pages.
International Search Report and Written Opinion in International Application No. PCT/US2015/018124, dated Jun. 3, 2015, 15 pages.

\* cited by examiner

METHODS AND DEVICES FOR PERFORMING PROXIMITY DISCOVERY

FIELD

This application generally relates to methods and devices for performing proximity discovery for device-to-device communication.

BACKGROUND

In cellular networks such as Long Term Evolution (LTE) and LTE-Advanced communication networks, a user equipment (UE) may communicate with other UEs via a base station and an evolved packet core (EPC) network. For example, a UE may send data packets to its serving base station on an uplink. The serving base station may forward the data packets to the EPC network, and the EPC network may forward the data packets to another base station or to the same base station that is serving another UE. Data transfer between the UEs is routed through the base station and the EPC network. The communication between the UEs is controlled by the policies set by the operator administering the network.

The UEs may communicate directly with each other using another radio access technology (RAT), such as a wireless local area network (WLAN) or Bluetooth, when the UEs are located in close proximity and have access to the other RAT. However, this multi-RAT communication generally requires the availability of the other RAT and the capability of the UEs to operate in the other RAT. Moreover, handover from cellular technology to the other RAT may result in service interruption and dropped calls.

BRIEF DESCRIPTION OF THE DRAWINGS

The accompanying drawings, which are incorporated in and constitute part of this specification, and together with the description, illustrate and serve to explain various examples.

DETAILED DESCRIPTION

The present disclosure is directed to devices and methods for performing proximity discovery for inter-device communication in cellular wireless communication systems. When a first user equipment (UE) in a cellular wireless network is located in close proximity with a second UE, it would be advantageous for the first UE to discover the second UE, or vice versa, such that they can communicate via a direct inter-device communication link between them, instead of transferring the data via the network. By providing a direct inter-device communication link between UEs, the UEs can receive proximity services (ProSe), and overall spectral efficiency may also be improved. Moreover, the direct link between the UEs generally requires lower transmit power at the UE compared to transmitting to a base station, thereby resulting in battery savings at the UEs. Additionally, it may be advantageous to enable communications over the inter-device communication link using the same cellular radio access technology (RAT).

Reference will now be made in detail to example approaches, which are illustrated in the accompanying drawings. The following description refers to the accompanying drawings in which the same numbers in different drawings represent the same or similar elements unless otherwise represented. The implementations set forth in the following description of example approaches do not represent all implementations. Instead, they are merely examples of devices and methods consistent with aspects related to the appended claims.

Figure 1:
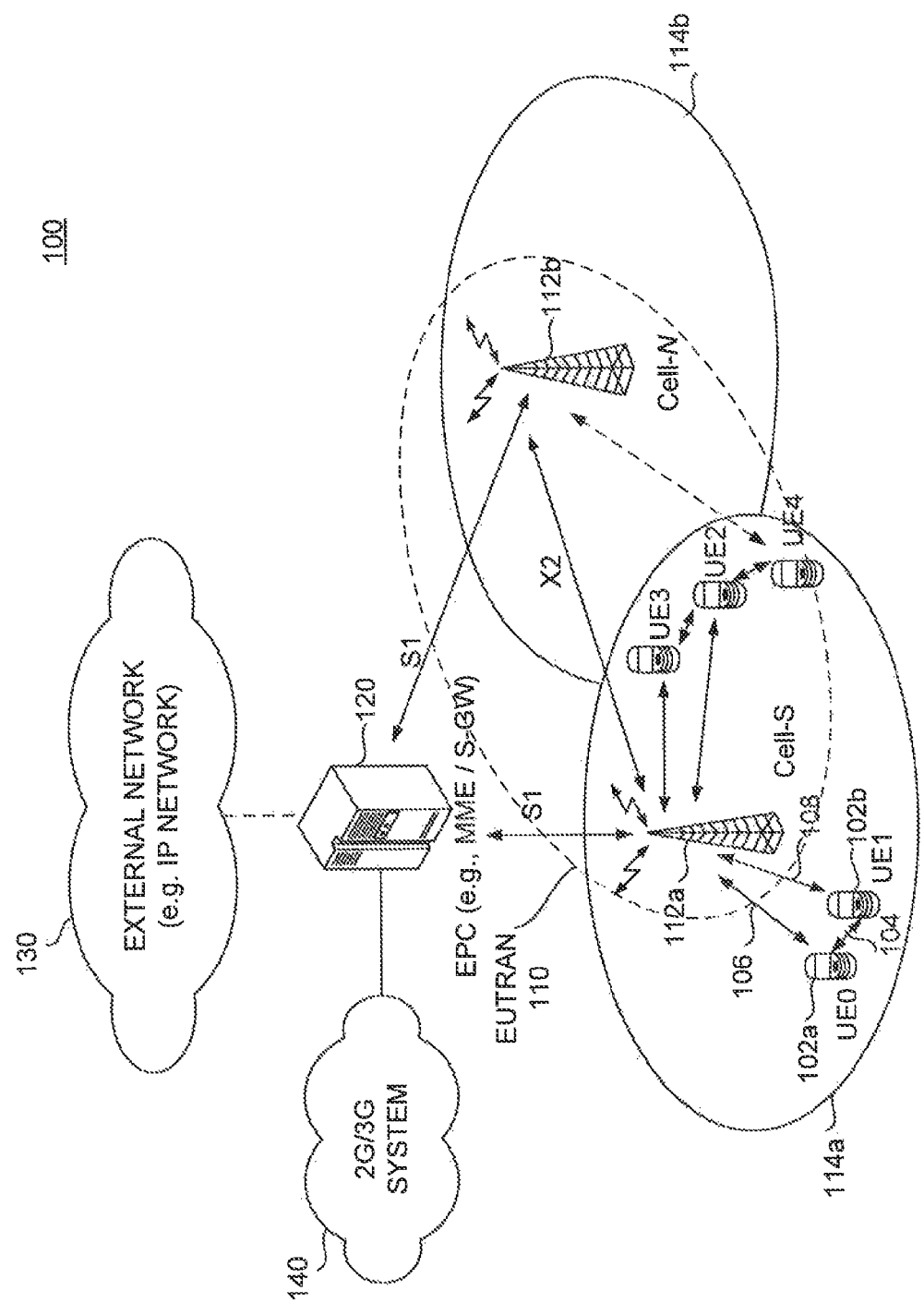
FIG. 1 illustrates a cellular wireless communication system, according to an example approach.

FIG. 1 illustrates an example cellular wireless communication system 100 in which methods and devices consistent with this disclosure may be implemented. The system 100 may include one or more base stations, and operate according to a wireless communication standard, such as a Long Term Evolution (LTE) standard. In the example LTE system 100, the base stations are shown as evolved Node Bs (eNBs), e.g., eNB 112a and eNB 112b, although base stations can operate in any wireless communications system, including for example, a macro cell, a femto cell, a relay cell, and a pico cell. Base stations are nodes that can relay signals for user equipment (UE) or for other base stations. The base stations are also referred to as access node devices. The example LTE telecommunications environment of FIG. 1 includes a radio access network such as an Evolved Universal Terrestrial Radio Access Network (EUTRAN) 110 including the eNB 112a and the eNB 112b, a core network (CN) such as an evolved packet core (EPC) 120, and an external network such as an Internet Protocol (IP) network 130. Further, as shown, one or more UEs, such as a UE 102a and a UE 102b, operate within the example LTE system 100. In some implementations, 2G/3G systems 140, e.g., Global System for Mobile Communications (GSM), Interim Standard 95 (IS-95), Universal Mobile Telecommunications System (UMTS), or Code Division Multiple Access 2000 (CDMA2000) may also be integrated into the system 100.

In example approaches, the EUTRAN 110 may include one or more eNBs, such as the eNB 112a and the eNB 112b. A cell 114a is a coverage area of the eNB 112a, and a cell 114b is a coverage area of the eNB 112b. One or more UEs, e.g., the UEs 102a and 102b, can operate in the cell 114a and be served by eNB 112a. The eNBs 112a and 112b can communicate directly to the UEs 102a and 102b. In some implementations, the eNB 112a or 112b may be in a one-to-many relationship with UEs, e.g., the eNB 112a can serve the UE 102a and the UE 102b within its coverage area, i.e., the cell 114a, but each of the UE 102a and the UE 102b may be connected to one serving eNB at a time. In some implementations, the eNBs 112a and 112b may be in a many-to-many relationship with UEs, e.g., the UE 102a and the UE 102b may be connected to the eNB 112a and the eNB 112b. The eNB 112a may be connected to the eNB 112b such that handover may be conducted if one or both of the UEs 102a and 102b travels, e.g., from the cell 114a to the cell 114b.

The UEs 102a and 102b may be any wireless electronic device used by an end-user. The UEs 102a and 102b may transmit voice, data, video, multimedia, text, web content and/or any other user/client-specific content. The transmission of some content, e.g., video and web content, may require high channel throughput to satisfy the end-user demand. In some instances, however, a channel between the UE 102a or 102b and the eNB 112a or 112b may be contaminated by, e.g., multipath fading which may be due to the multiple signal paths arising from many reflections in the wireless environment. Accordingly, transmission of the UEs 102a and 102b may adapt to the wireless environment. In short, the UEs 102a and 102b may generate requests, send responses or otherwise communicate in different means with the EPC 120 and/or the IP network 130 through one or more eNBs 112a and 112b.

In some implementations, the UEs 102a and 102b may communicate over an inter-device communication link 104 when they are located in close proximity to one another, without routing communication data through the eNB 112a or 112b. The boundary of the distance of the inter-device communication link may be limited by the transmission power of the UEs 102a and 102b. In one example, close proximity could be a few meters. In another example, close proximity could be tens of meters. It is also possible that in certain circumstances, the close proximity may mean larger distance such as hundreds of meters or more. For example, the UEs 102a and 102b may communicate directly over the inter-device communication link 104, instead of communicating with each other through their links 106 and 108 with the eNB 112a, respectively. The inter-device communication link may also be referred to as a device-to-device (D2D) communication link. The UEs 102a and 102b may simultaneously maintain an active communication link with the eNB 112a such that the UEs 102a and 102b may still receive messages from the eNB 112a or other UEs, when communicating with each other over the direct inter-device link 104.

Examples of UEs include, but are not limited to, a mobile phone, a smart phone, a telephone, a television, a remote controller, a set-top box, a computer monitor, a computer (including a tablet computer, a desktop computer, a handheld or laptop computer, a netbook computer), a personal digital assistant (PDA), a microwave, a refrigerator, a stereo system, a DVD player or recorder, a CD player or recorder, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, a game device, etc. The UE 102a or 102b may include a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, the UE 102a or 102b may include the device without such a module. The term "UE" can also refer to any hardware or software component that can terminate a communication session for a user. In addition, the terms "user equipment," "UE," "user equipment device," "user agent," "UA," "user device," and "mobile device" are used synonymously herein.

A radio access network (RAN) is part of a mobile telecommunication system which implements a radio access technology, such as Universal Mobile Telecommunications System (UMTS), CDMA2000 and 3rd Generation Partnership Project (3GPP) LTE. For example, the RAN included in the example LTE system 100 is the EUTRAN 110. The EUTRAN 110 can be located between the UEs 102a, 102b and the EPC 120. The EUTRAN 110 includes at least one eNB 112a or 112b. Each eNB can be a radio base station that may control all, or at least some, radio related functions in a fixed part of the system. One or more of the eNBs 112a and 112b can provide radio interface within their coverage area or a cell for the UEs 102a, 102b to communicate. The eNBs 112a and 112b may be distributed throughout the cellular network to provide a wide area of coverage. The eNBs 112a and 112b may directly communicate with one or more of the UEs 102a and 102b, other eNBs, and the EPC 120.

The eNBs 112a and 112b may be an end point of the radio protocols towards the UEs 102a, 102b and may relay signals between the radio connection and the connectivity towards the EPC 120. The communication interface between the eNB 112a or 112b and the EPC 120 is often referred to as an S1 interface. In certain implementations, the EPC 120 is a central component of the core network (CN). The CN can be a backbone network, which may be a central part of the telecommunications system. The EPC 120 can include a mobility management entity (MME), a serving gateway (S-GW), and a packet data network gateway (PGW). The MME may be the main control element in the EPC 120 responsible for the functionalities comprising the control plane functions related to subscriber and session management. The SGW can serve as a local mobility anchor, such that data packets are routed through this point for intra EUTRAN 110 mobility and mobility with other legacy 2G/3G systems 140. The S-GW functions may include user plane tunnel management and switching. The PGW may provide connectivity to the services domain comprising external networks 130, such as the IP networks. The UEs 102a and 102b, the EUTRAN 110, and the EPC 120 are sometimes referred to as the evolved packet system (EPS). It is to be understood that the architectural evolvement of the example LTE system 100 is focused on the EPS. The functional evolution may include both the EPS and the external network 130.

Though described in terms of FIG. 1, the present disclosure is not limited to such an environment. In general, cellular telecommunication systems may be described as cellular networks made up of a number of radio cells, or cells that are each served by a base station or other fixed transceiver. The cells are used to cover different locations in order to provide radio coverage over an area. Example cellular telecommunication systems include Global System for Mobile Communication (GSM) protocols, Universal Mobile Telecommunications System (UMTS), 3GPP Long Term Evolution (LTE), and others. In addition to cellular telecommunication systems, wireless broadband communication systems may also be suitable for the various implementations described in the present disclosure. Example wireless broadband communication systems include IEEE 802.11 WLAN, IEEE 802.16 WiMAX network, etc.

Figure 2:
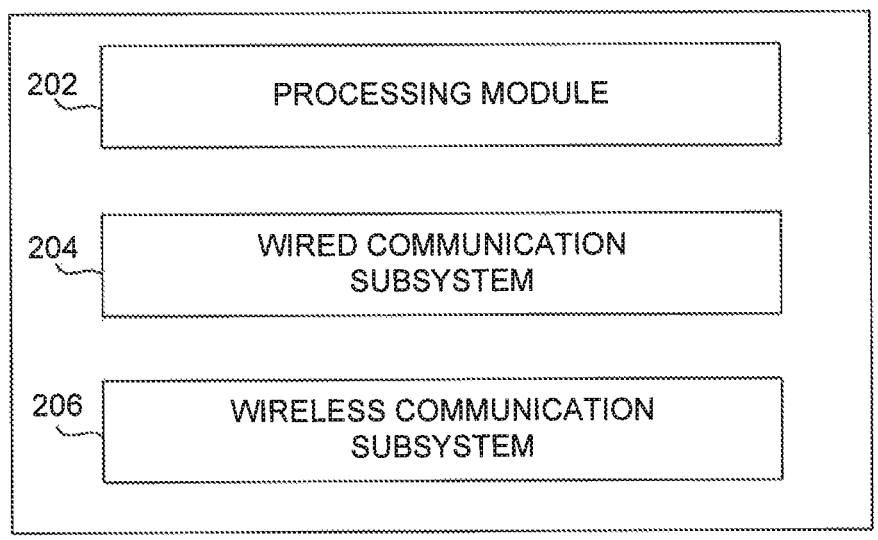
FIG. 2 illustrates a block diagram of an access node device, according to an example approach.

FIG. 2 illustrates a block diagram of an access node device 200, according to an example approach. For example, the access node device 200 may be a base station, such as the eNB 112a or 112b (FIG. 1). Referring to FIG. 2, the access node device 200 includes a processing module 202, a wired communication subsystem 204, and a wireless communication subsystem 206. The processing module 202 can include one or more processing components (alternatively referred to as "processors" or "central processing units" (CPUs)) operable to execute instructions associated with managing (inter-device-driver) IDC interference. The processing module 202 can also include other auxiliary components, such as random access memory (RAM), read only memory (ROM), secondary storage (for example, a hard disk drive or flash memory). Additionally, the processing module 202 can execute certain instructions and commands to provide wireless or wired communication, using the wired communication subsystem 204 or the wireless communication subsystem 206. One skilled in the art will readily appreciate that various other components can also be included in the example access node device 200 without departing from the principles of the present disclosure.

Figure 3:
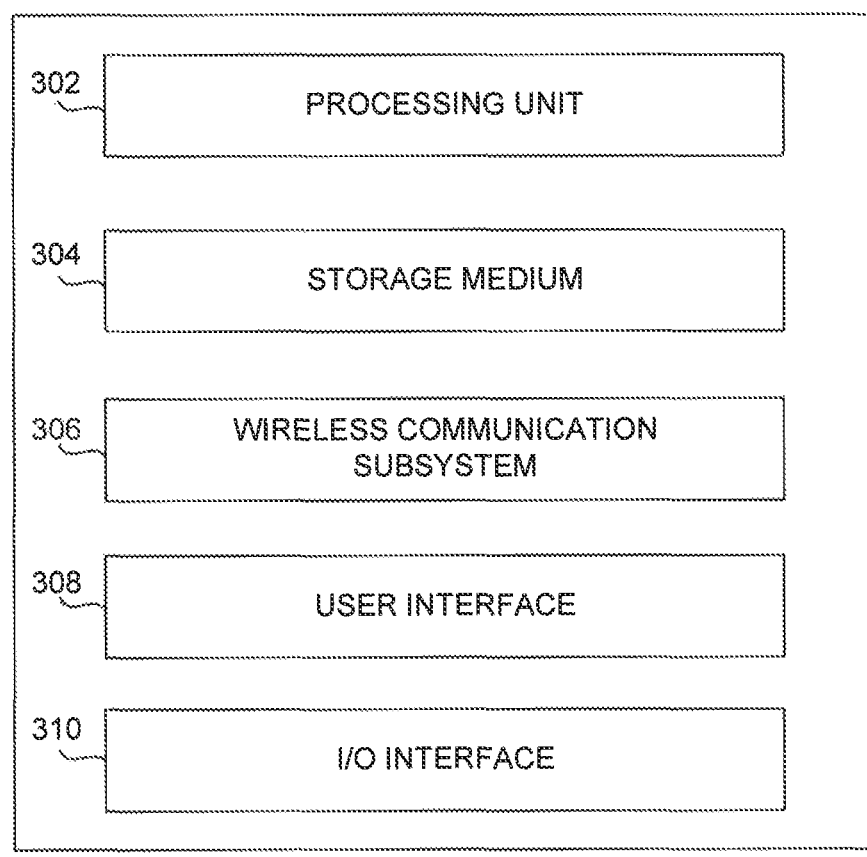
FIG. 3 illustrates a block diagram of user equipment (UE), according to an example approach.

FIG. 3 illustrates a block diagram of a UE 300, according to an example approach. Referring to FIG. 3, the UE 300 includes a processing unit 302, a tangible, non-transitory computer readable storage medium 304 (for example, ROM or flash memory), a wireless communication subsystem 306, a user interface 308, and an I/O interface 310.

The processing unit 302 may include components and perform functionality similar to the processing module 202 described with regard to FIG. 2. The wireless communication subsystem 306 may be configured to provide wireless communications for data information or control information provided by the processing unit 302. The wireless communication subsystem 306 can include, for example, one or more antennas, a receiver, a transmitter, a local oscillator, a mixer, and a digital signal processing (DSP) unit. In some implementations, the wireless communication subsystem 306 may receive or transmit information over a direct inter-device communication link. In some implementations, the wireless communication subsystem 306 can support MIMO transmissions.

The user interface 308 can include, for example, one or more of a screen or touch screen (for example, a liquid crystal display (LCD), a light emitting display (LED), an organic light emitting display (OLED), a microelectromechanical system (MEMS) display, a keyboard or keypad, a tracking device (e.g., trackball, trackpad), a speaker, and a microphone).

The I/O interface 310 can include, for example, a universal serial bus (USB) interface. One skilled in the art will readily appreciate that various other components can also be included in the example UE device 300.

For UEs to perform device-to-device (D2D) communication over a direct inter-device communication link, an inter-device communication link is enabled between the UEs. The direct inter-device communication link allows data exchange between the UEs, without routing through a base station and a core network.

Figure 4:
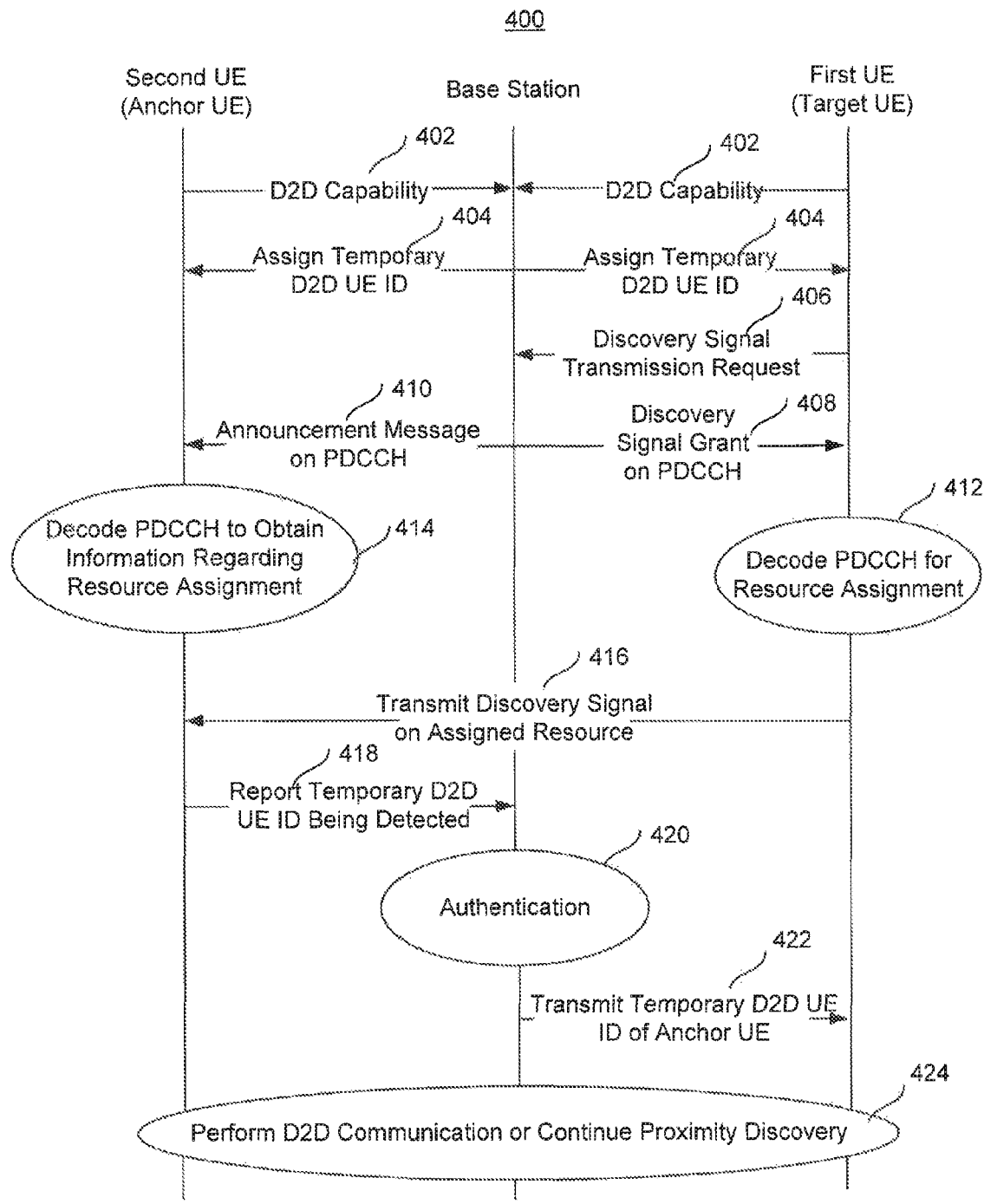
FIGS. 4 and 5 are flow diagrams of methods for performing proximity discovery, according to example approaches.

FIG. 4 is a flow diagram of a method 400 for performing proximity discovery, according to an example approach. In the illustrated approach, a plurality of UEs, including a first UE and a second UE, are in a coverage area of a base station in a wireless network. For example, the first UE and the second UE may be the UEs 102a and 102b (FIG. 1), respectively, and the base station may be the eNB 112a (FIG. 1).

Referring to FIG. 4, the first UE sends the base station an indication message indicating its capability of performing D2D communication (402). For example, the first UE may send the indication message when performing network entry. Also for example, the first UE may send the indication message in response to a request from the base station. As another example, the first UE may send the indication message when the first UE attempts to initiate D2D communications. In one example approach, the first UE may modify an existing radio resource control (RRC) uplink (UL) message with a new information element (IE) to generate the indication message. In another example approach, the first UE may generate the indication message by generating a new RRC UL message, e.g., a UE capability indication message. Similarly, the second UE also sends the base station an indication message indicating its capability of performing D2D communication (402). One or more additional UEs in the coverage area (not shown) may also send a similar indication to the base station.

The base station receives the indication messages from the UEs and, in response, assigns a temporary D2D UE identifier (ID) to each of the UEs (404). A temporary D2D UE ID may be used to deliver resource assignment to a UE involved in D2D communications, and also used to identify the UE involved in D2D communications. A temporary D2D UE ID may be released when the UE leaves D2D communications, e.g., when the UE physically leaves the coverage area of the base station, or when the UE indicates to the base station its desire to leave. As a result, each of the UEs receives its assigned temporary D2D UE ID from the base station.

In example approaches, the first UE wants to initiate proximity discovery. Accordingly, the first UE, referred to hereafter as the target UE, sends a discovery signal transmission request to the base station (406). For example, the target UE may send the discovery signal transmission request via a modified existing RRC message or a new RRC message. Also for example, the target UE may send the discovery signal transmission request via a new media access control (MAC) control element (CE) or a reserved field in an existing MAC CE.

After receiving the discovery signal transmission request, the base station may grant the request by transmitting on, e.g., a physical downlink control channel (PDCCH), control information and a resource assignment for uplink transmission to the target UE (408). For example, the resource assignment for uplink transmission may assign a physical uplink shared channel (PUSCH) or a physical uplink control channel (PUCCH). The base station also transmits to the second UE, referred to hereafter as the anchor UE, an announcement message on the PDCCH to notify the anchor UE of the resource assignment for uplink transmission (410). In some approaches, the base station may receive multiple discovery signal transmission requests from multiple target UEs. Accordingly, the base station may grant the multiple requests on the PDCCH. Similarly, the base station may send the announcement message to multiple anchor UEs. e.g., those that did not send a discovery signal transmission request. In some approaches, a target UE that sends a discovery signal may also be an anchor UE that receives a discovery signal from another UE.

In example approaches, the base station may select resources for uplink transmission, e.g., based on channel state information (CSI) feedback from the UEs. Alternatively and/or additionally, the base station may dedicate resources for uplink transmission. The base station may also select resources for uplink transmission in a round robin manner or randomly to enhance discovery probability at a given time. For example, round-robin (RR) is a scheduling method in which time slices are assigned to each transmission process in circular order, such that the base station may handle all processes without priority.

In example approaches, the base station may include error detection in a message. For example, the base station may generate a cyclic redundancy check (CRC) code for a message including the resource assignment for uplink transmission, which can provide error detection for decoding the message, so that a UE, e.g., the first UE, can determine whether it has correctly received the message on the PDCCH. Furthermore, the base station may scramble the generated CRC code with an identifier of the UE for proximity discovery, e.g., a radio network temporary identifier (RNTI) assigned to the UE, such that the UE can identify information intended for it on the PDCCH. Alternatively, the base station may include the identifier of the UE in a payload of the PDCCH.

In one example approach, the RNTI of the UE may have a hexadecimal value in a predetermined range from FFF4 to FFFC. In one example approach, the RNTI of the UE may have a predetermined value 0000. In one example approach, the RNTI of the UE may have a hexadecimal value in a predetermined range from 0001 to FFF3.

In example approaches, the PDCCH may carry uplink resource assignment and control information for a UE or a group of UEs with the RNTI. The PDCCH is generally transmitted on an aggregation of one or several consecutive control channel elements (CCEs), where a control channel element may correspond to a predetermined number of resource element groups, e.g., 9 resource element groups.

In example approaches, control information transmitted on the PDCCH may include a flag to differentiate between Format 0 and Format 1A of the PDCCH provided in the LTE standard, a flag to differentiate between Format 0 and a current format, resource assignments for uplink transmission and downlink transmission, and a frequency hopping flag indicating if a frequency hopping is applied. Control information transmitted on the PDCCH may also include a number of target UEs requesting proximity discovery, their assigned temporary D2D UE IDs, information regarding discovery signals to be transmitted by the target UEs including, e.g., patterns, locations, and modulation and coding schemes (MCSs) for the discovery signals, and power control commands for the assigned PUSCH. Control information transmitted on the PDCCH may additionally include a request for an acknowledgement or negative-acknowledgement (ACK/NACK) of proximity discovery, and a preconfigured bitmap representing a hopping pattern if a frequency hopping is applied.

The target UE then decodes the PDCCH to receive the resource assignment for uplink transmission and the control information (412), and the anchor UE decodes the PDCCH to obtain information regarding the resource assignment for uplink transmission (414).

The target UE may then transmit, based on the received control information, a discovery signal including the temporary D2D UE ID of the target UE, on the assigned resource for uplink transmission, such as on the PUSCH or on the PUCCH (416), or on the PDSCH. In one example approach, the target UE may broadcast the discovery signal. Because the anchor UE obtains the information regarding the resource assignment for uplink transmission, the anchor UE detects the discovery signal including the temporary D2D UE ID of the target UE and further transmits a reporting message to the base station reporting the temporary D2D UE ID being detected (418). For example, the anchor UE may transmit the reporting message to the base station on the PUCCH or on the PUSCH. Similarly, in some approaches, other target UEs in the coverage area of the base station may transmit discovery signals on their assigned resource for uplink transmission, and other anchor UEs in the coverage area may report detection of temporary D2D UE IDs to the base station. The anchor UEs may consolidate the detection of multiple target UEs in the same reporting, e.g., on the PUCCH or on the PUSCH.

Still referring to FIG. 4, after receiving the reporting message from the anchor UE, the base station performs an authentication on a relationship between the anchor UE and the target UE (420). Upon authentication, the base station transmits the temporary D2D UE ID of the anchor UE to the target UE (422). The target UE and the anchor UE may then perform D2D communication using close proximity RAT, or continue proximity discovery (424).

Figure 5:
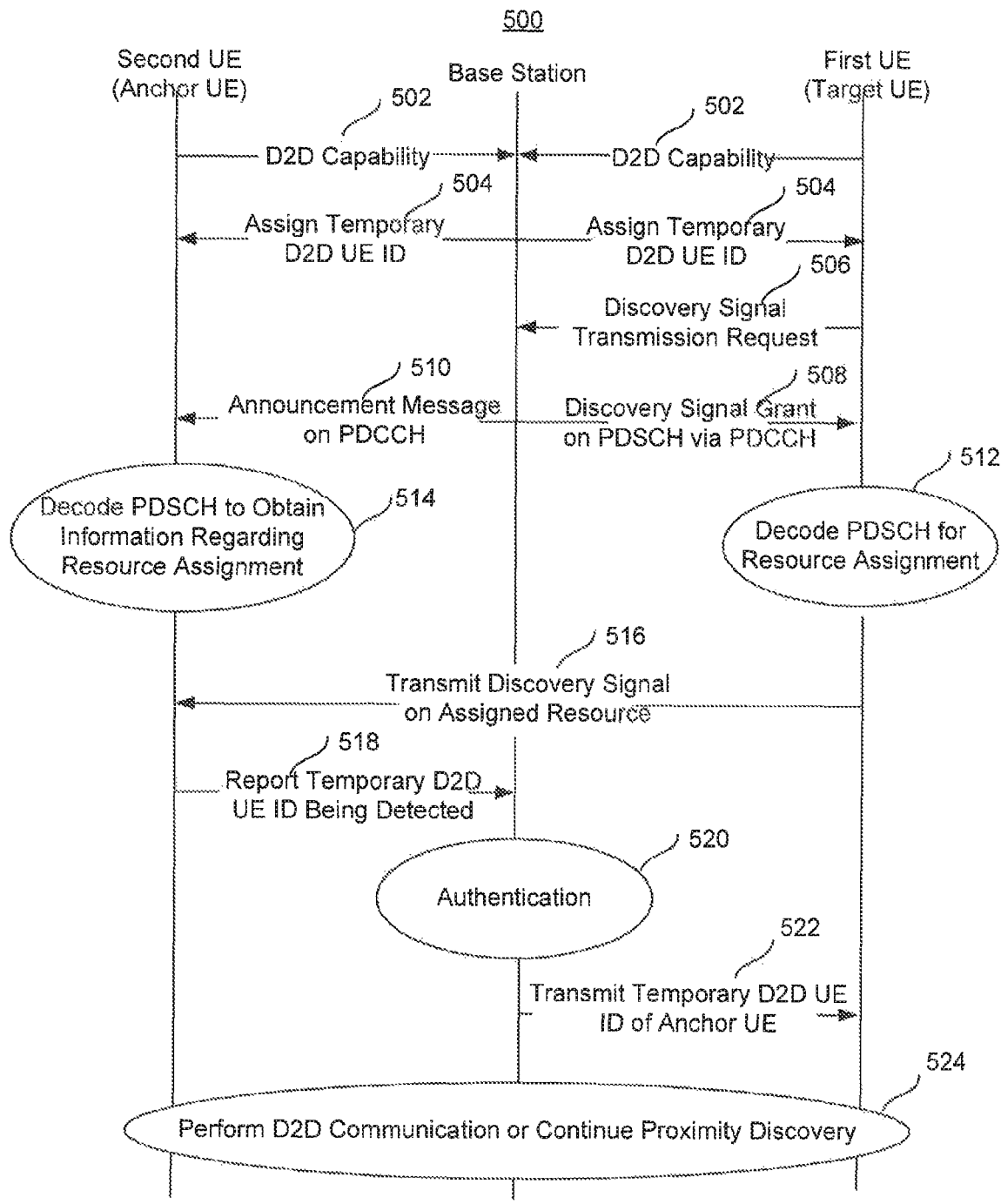

FIG. 5 is a flow diagram of a method 500 for performing proximity discovery, according to an example approach. In the illustrated approach, a plurality of UEs including a first UE and a second UE are in a coverage area of a base station in a wireless network. For example, the first UE and the second UE may be the UEs 102a and 102b (FIG. 1), respectively, and the base station may be the eNB 112a (FIG. 1).

Referring to FIG. 5, the first UE sends the base station an indication message indicating its capability of performing D2D communication (502). For example, the first UE may send the indication message when performing network entry. Also for example, the first UE may send the indication message in response to a request from the base station. In one approach, the first UE may modify an existing radio resource control (RRC) uplink (UL) message with a new information element (IE) to generate the indication message. In another approach, the first UE may generate the indication message by generating a new RRC UL message, e.g., a UE capability indication message. Similarly, the second UE and any other UEs in the coverage area each also send the base station an indication message indicating its capability of performing D2D communication (502).

The base station receives the indication messages from the UEs and, in response, assigns a temporary D2D UE identifier (ID) to each of the UEs (504). Thus, each of the UEs receives its assigned temporary D2D UE ID from the base station.

In example approaches, the first UE initiates proximity discovery. Accordingly, the first UE, referred to hereafter as the target UE, sends a discovery signal transmission request to the base station (506). For example, the target UE may send the discovery signal transmission request via a modified existing RRC message or a new RRC message. Also for example, the target UE may send the discovery signal transmission request via a new media access control (MAC) control element (CE) or a reserved field in an existing MAC CE.

After receiving the discovery signal transmission request, the base station grants the request by transmitting on a PDCCH a resource assignment for a physical downlink shared channel (PDSCH), and further transmitting on the PDSCH control information and resource assignment for uplink transmission to the target UE (508). For example, the base station may receive multiple discovery signal transmission requests from multiple target UEs, and the PDCCH may not provide sufficient time and/or frequency resources to transmit control information and resource assignments for uplink transmission. Accordingly, the base station transmits the control information and the resource assignments for uplink transmission on the PDSCH via the PDCCH. Also for example, the resource assignment for uplink transmission may assign a PUSCH or a PUCCH.

Figure 6:
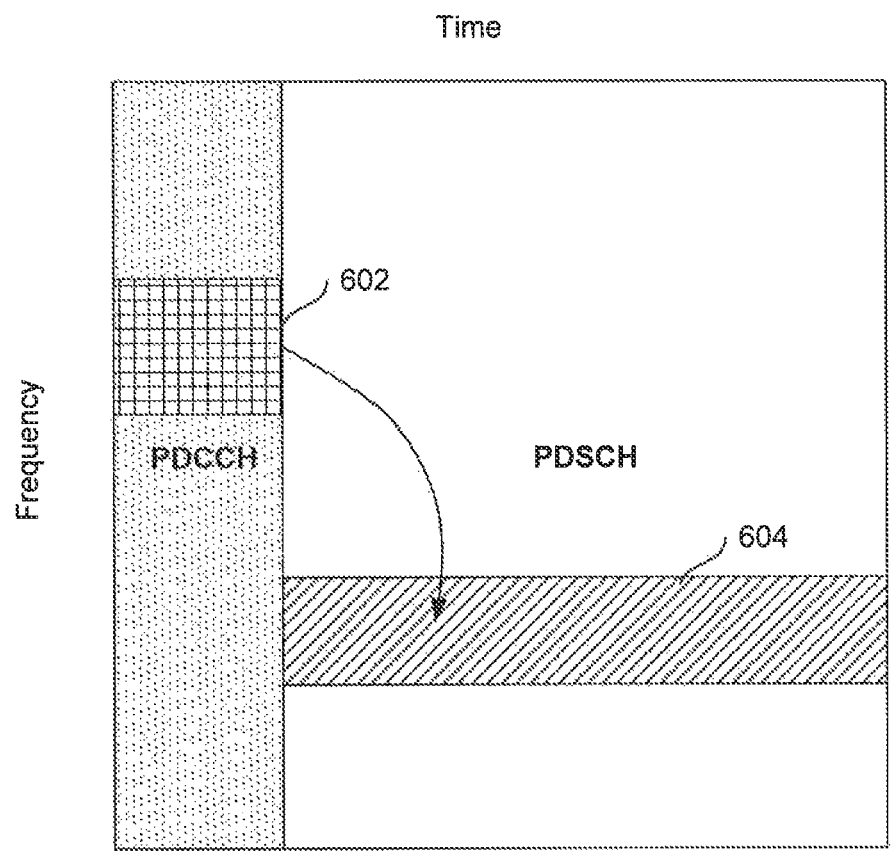
FIG. 6 is a diagram illustrating assignment of a physical downlink shared channel (PDSCH) via a physical downlink control channel (PDCCH), according to an example approach.

FIG. 6 is a diagram illustrating an example approach wherein the base station assigns a PDSCH via a PDCCH. Referring to FIG. 6, the base station assigns a part 602 of the PDCCH to transmit the resource assignment for a part 604 of the PDSCH, and further assigns the part 604 of the PDSCH to transmit the control information and the resource assignment for uplink transmission. When the UE decodes the part 602 of the PDCCH, the UE knows where on the PDSCH to receive the control information and the resource assignment for uplink transmission, i.e., the part 604 of the PDCCH.

Referring back to FIG. 5, the base station also transmits to the second UE, referred to hereafter as the anchor UE, an announcement message on the PDCCH to notify the anchor UE of the resource assignment for uplink transmission (510). In addition, the base station may use a CRC code and a RNTI for transmission on the PDCCH, similar to the above description in connection with FIG. 4.

In some approaches, control information transmitted on the PDSCH may include uplink resource assignments for discovery signals at subframe n; a time offset from a current subframe k, where 1<k<P and P is a configurable parameter that can be defined by the network; and a number of target UEs that transmit discovery signals at subframe n+k. Control information transmitted on the PDSCH may also include a duration for transmitting discovery signals; temporary D2D UE IDs of the target UEs; and a bitmap representing a hopping pattern if resource hopping is used in the duration for transmitting discovery signals. Control information transmitted on the PDSCH may further include information regarding discovery signals to be transmitted by the target UEs including, e.g., patterns, locations, and modulation and coding schemes (MCSs), DM-RS locations, cyclic shift information, a number of bits of each temporary D2D UE ID, a number of assigned resource blocks (RBs), etc. Control information transmitted on the PDSCH may additionally include timing advance of the target UEs that transmit proximity discovery signals, which may be used for distance estimation between UEs, and the temporary D2D UE ID of the anchor UE if groupcast is supported by the network.

As a result, the target UE may decode the PDCCH and further decode the PDSCH to receive the control information and the resource assignment for uplink transmission (512), and the anchor UE may decode the PDCCH and further decode the PDSCH to obtain information regarding the resource assignment included in the announcement message (514).

The target UE may then transmit, based on the received control information, a discovery signal, including the temporary D2D UE ID of the target UE, on the assigned resource for uplink transmission, such as on the PUSCH or on the PUCCH (516). Since the anchor UE obtains the information regarding the resource assignment for uplink transmission, the anchor UE detects the discovery signal including the temporary D2D UE ID of the target UE, and further transmits a reporting message to the base station reporting the temporary D2D UE ID being detected (518). Similarly, other target UEs in the coverage area of the base station may transmit discovery signals on their assigned resource for uplink transmission, and other anchor UEs in the coverage area may report detection of temporary D2D UE IDs to the base station. The anchor UEs may consolidate the detection of multiple target UEs in the same reporting.

Still referring to FIG. 5, after receiving the reporting message from the anchor UE, the base station performs an authentication on a relationship between the anchor UE and the target UE (520). Upon authentication, the base station transmits the temporary D2D UE ID of the anchor UE to the target UE (522). The target UE and the anchor UE may then perform D2D communication using close proximity RAT, or continue proximity discovery (524).

In example approaches, based on the resource assignment for uplink transmission received from the base station, the target UE may transmit the discovery signal on the PUSCH. For example, the target UE encodes its temporary D2D UE ID using a tail-biting convolutional code or a turbo code to generate the discovery signal, and transmits the generated discovery signal on the PUSCH.

Figure 7:
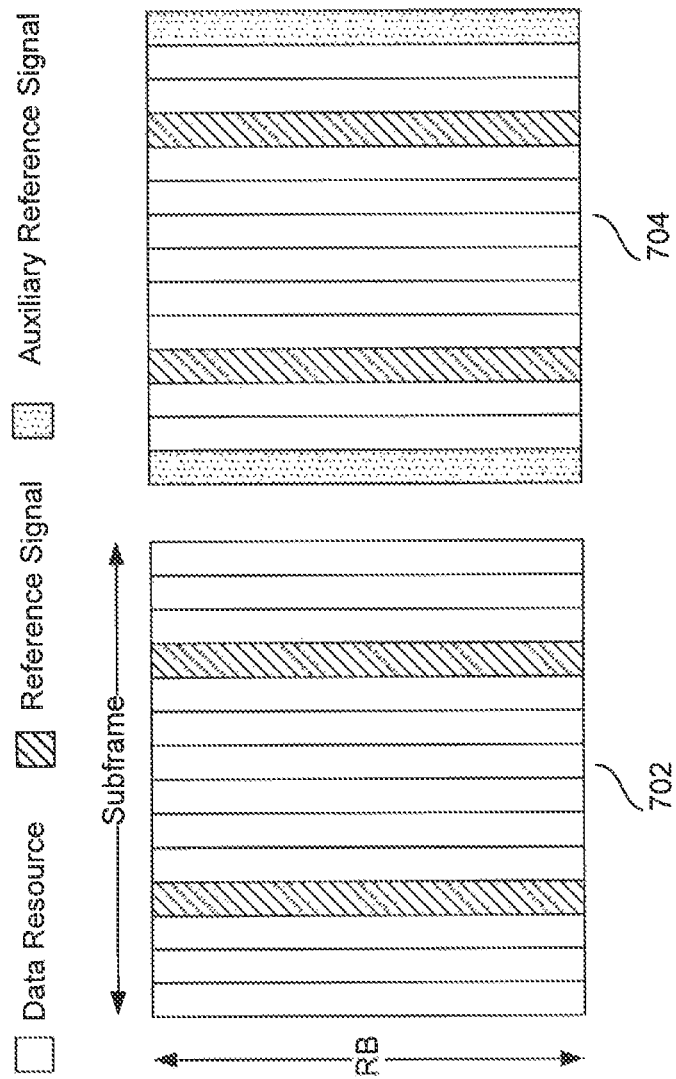
FIGS. 7a and 7b show formats of the PUSCH, according to example approaches.

FIGS. 7a and 7b show formats 702 and 704, respectively, of the PUSCH, according to example approaches. For example, each of the formats 702 and 704 may include multiple symbols, such as 14 single carrier frequency division multiple access (SC-FDMA) symbols, each represented by one column in the format. In the illustrated approach in FIG. 7a, the PUSCH format 702 may consist of, e.g., 144 available resource elements corresponding to 12 subcarriers (not shown) and 12 non-reference symbols. Accordingly, for example, 144 bits of temporary D2D UE ID information, including CRC bits, may be transmitted, if a quadrature phase shift keying (QPSK) modulation and a rate-½ tail-biting convolutional code are used. In the illustrated approach in FIG. 7b, the PUSCH format 704 may include the first and last symbols used for guard interval. In this case, for example, 120 resource elements, corresponding to 12 subcarriers (not shown) and 10 non-reference symbols, may be used to carry temporary D2D UE ID information including CRC bits. Further, the guard interval may be used as auxiliary reference signals to enhance quality of channel estimates. Thus, in the illustrated approach of FIG. 7b, reference signals in the $4^{th}$ and $11^{th}$ symbols may be repeated on the first and last symbols for the auxiliary reference signals, respectively, to thereby mitigate interference from other UEs. In some approaches, additional reference signals may be included in the symbols. For example, the $3^{rd}$ and $10^{th}$ symbols may further be assigned to include reference signals.

In example approaches, a number of resource blocks on the PUSCH may be configured based on a bit length of temporary D2D UE IDs transmitted on the PUSCH. Cyclic shift for multiplexing UEs and channel coding may also be applied to map a temporary D2D UE ID into multiple resource blocks. Hence, cyclic shift and orthogonal codes may be applied to discovery signals to provide the multiplexing capability.

In example approaches, time-division multiplexing (TDM), frequency-division multiplexing (FDM) and/or code-division multiplexing (CDM) may be implemented to provide multi-user multiplexing gains for discovery signals transmitted on the allocated PUSCH resource. In another approach, multiple resource blocks on the PUSCH are assigned for discovery signal transmission, and a different combination of UEs may transmit discovery signals in a resource block, which are also referred to as multiplexing UEs.

Figure 8:
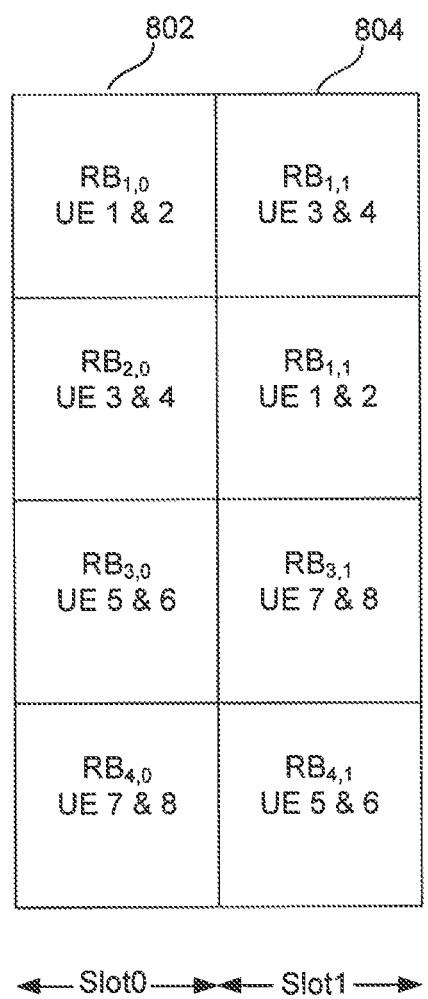
FIG. 8 is a diagram showing multiplexing UEs, according to an example approach.

FIG. 8 is a diagram showing multiplexing UEs, according to an example approach. In the illustrated approach, it is assumed that UE1, UE2, . . . , and UE8 transmit their respective discovery signals on the PUSCH. Further, a first resource block group (RBG) 802 including resource blocks $RB_{1,0}$, $RB_{2,0}$, $RB_{3,0}$, and $RB_{4,0}$ correspond to a first time slot, Slot0, and a second RBG 804 including resource blocks $RB_{1,1}$, $RB_{2,1}$, $RB_{3,1}$, and $RB_{4,1}$ correspond to a second time slot, Slot1. As shown in FIG. 8, a different combination of UEs transmits discovery signals in each resource block in the RBG 802 or 804.

In example approaches, based on the resource assignment for uplink transmission received from the base station, one or more target UEs may transmit the discovery signal on the PUCCH. For example, multiple UEs may transmit their respective discovery signals on the PUCCH simultaneously. In some approaches, some UEs may transmit their respective discovery signals over the allocated PUSCH resource, while some UEs may transmit their respective discovery signals over the allocated PUCCH resource.

Figure 9:
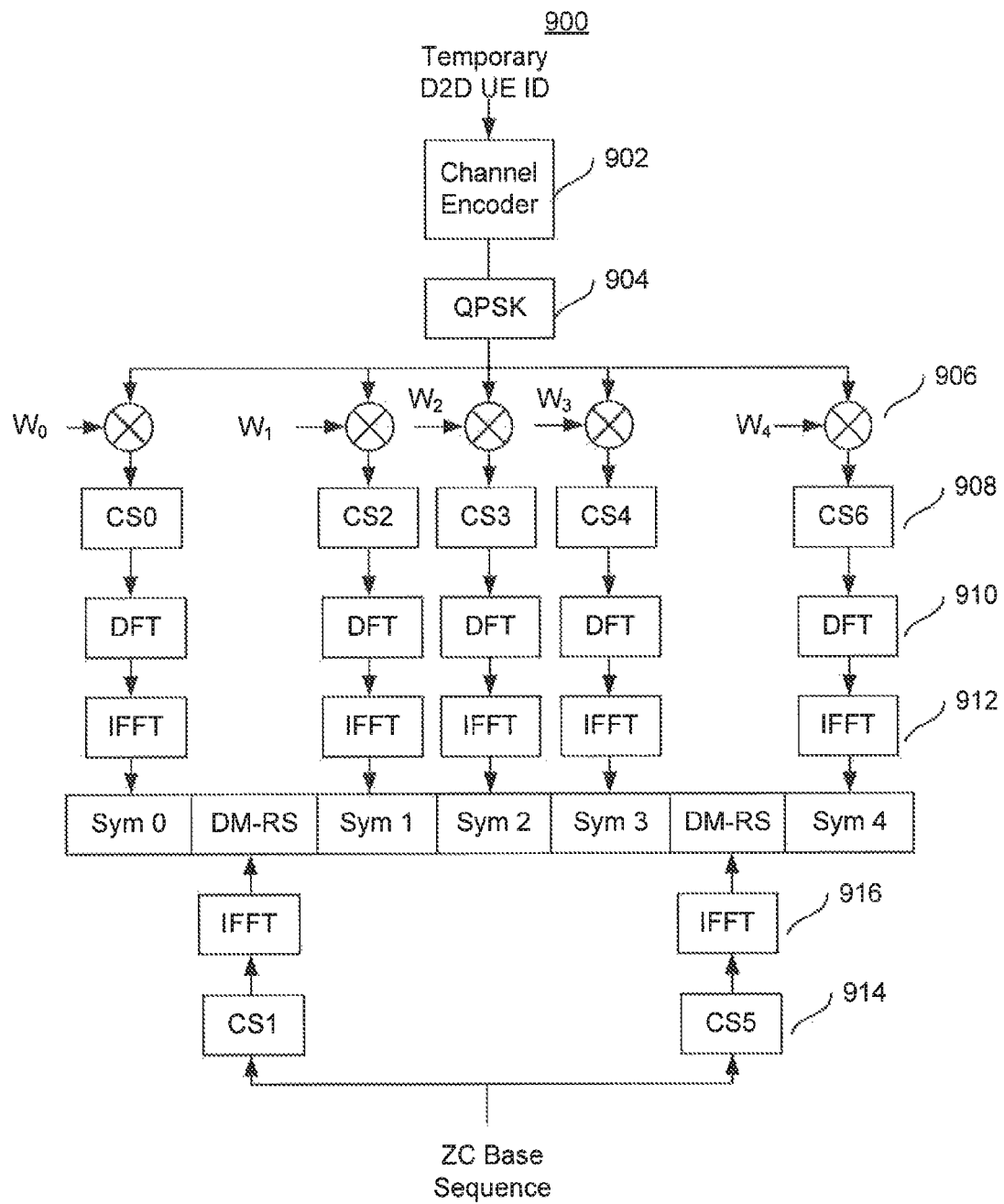
FIGS. 9-11 are diagrams illustrating methods for a UE to transmit a discovery signal on a physical uplink control channel (PUCCH), according to example approaches.

FIG. 9 is a diagram illustrating a method 900 for a target UE to transmit a discovery signal on the PUCCH, according to an example approach. Referring to FIG. 9, the target UE may use a channel encoder to encode its assigned temporary D2D UE ID, which has a length of, e.g., 10 bits, with a Reed-Muller code, such as a (32, k) Reed-Muller code, to generate 32 coded bits, and punctures the 32 bits to 24 bits (902), where k is the bit length of the temporary D2D UE ID. The target UE may then modulate the 24 bits with the QPSK modulation (904). The target UE may further multiply the QPSK output with each orthogonal code, e.g., $w_0, w_1, \ldots$, and $w_4$, in a set of orthogonal codes (906), apply cyclic shift (CS) codes CS0, CS2, CS3, CS4, and CS6 (908), apply discrete Fourier transforms (DFTs) (910), and apply inverse fast Fourier transforms (IFFTs) (912), to generate a plurality of symbols, e.g., Sym0, Sym1, . . . , and Sym4, including information regarding the temporary D2D UE ID. The target UE may additionally generate symbols including demodulation reference signals (DM-RS) by applying CS codes CS1 and CS5 (914) and IFFTs (916) to a Zadoff-Chu (ZC) base sequence. Accordingly, the target UE may transmit the discovery signal, including the symbols Sym0, Sym1, . . . , and Sym4 and the reference symbols DM-RS in a resource block on the PUCCH. In example approaches, when the length of the temporary D2D UE ID is larger than 10 bits, the target UE may transmit the temporary D2D UE ID on two or more resource blocks. In some approaches, the target UE may transmit a discovery signal using a subset of the elements in FIG. 9, e.g., based on the number of symbols included in a resource block.

Figure 10:
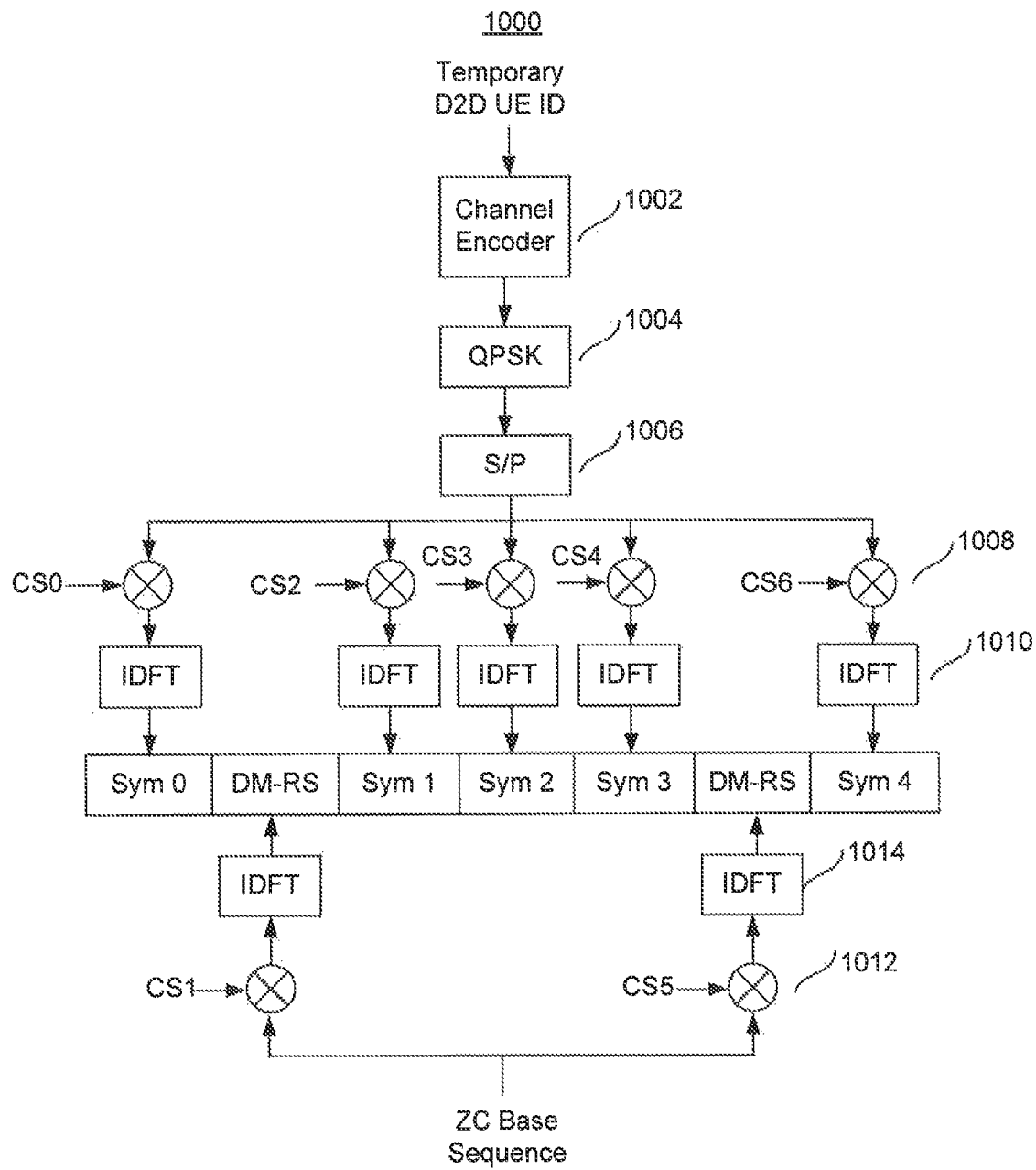

FIG. 10 is a diagram illustrating a method 1000 for a target UE to transmit a discovery signal on the PUCCH, according to an example approach. Referring to FIG. 10, the target UE may use a channel encoder to encode its assigned temporary D2D UE ID, which has a length of, e.g., 10 bits, with a Reed-Muller code, such as a rate ½ punctured (20, k) Reed-Muller code, to generate 20 coded bits (1002). The target UE may then modulate the first 10 bits of the 20 bits with the QPSK modulation (1004) followed by a serial-to-parallel (S/P) conversion (1006). For the output of the S/P conversion, the target UE may further apply CS codes CS0, CS2, CS3, CS4, and CS6 (1008), and apply inverse discrete Fourier transforms (IDFTs) (1010), to generate a plurality of symbols, e.g., Sym0, Sym1, . . . , and Sym4 including information regarding the first 10 bits. The target UE may additionally generate symbols including demodulation reference signals (DM-RS) by applying CS codes CS1 and CS5 (1012) and IDFTs (1012) to a ZC base sequence. Accordingly, the target UE may transmit the discovery signal, including the symbols corresponding to the first 10 bits and the reference symbols DM-RS, in a first time slot on the PUCCH. Similarly, the target UE may transmit the discovery signal, including symbols corresponding to the last 10 bits and the reference symbols DM-RS, in a second time slot on the PUCCH. In some approaches, the target UE may transmit a discovery signal using a subset of the elements in FIG. 10, e.g., based on the number of symbols included in a resource block.

In one example approach, the first and second time slots may be used for different UEs. In another example approach, locations of reference signals whose transmit power is different than that of the temporary D2D UE ID information may be permuted into other symbols within a time slot to multiplex additional UEs. In this case, the base station may transmit control information including a bitmap of reference signals on the PDCCH or on the PDSCH via the PDCCH.

Figure 11:
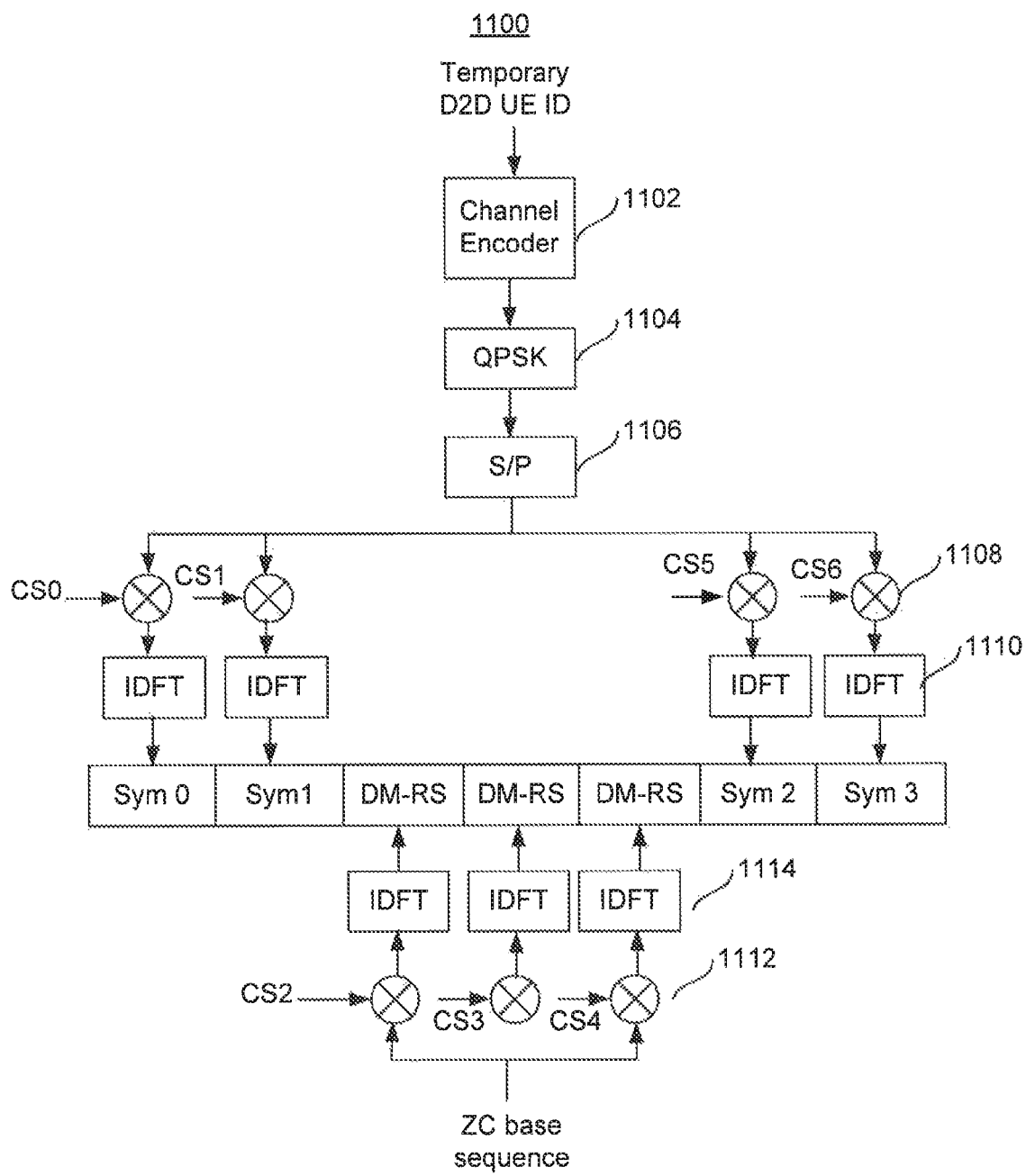

FIG. 11 is a diagram illustrating a method 1100 for a target UE to transmit a discovery signal on the PUCCH, according to an example approach. Referring to FIG. 11, the target UE may use a channel encoder to encode its assigned temporary D2D UE ID, which has a length of, e.g., 10 bits, with a convolutional code, such as a rate (16, k) convolutional code, to generate 16 coded bits (1102), where k is the bit length of the temporary D2D UE ID. The target UE may then modulate the first 8 bits of the 16 bits with the QPSK modulation (1104) followed by a serial-to-parallel (SIP) conversion (1106). For the output of the S/P conversion, the target UE may further apply each CS code CS0, CS1, CS5, and CS6 (1108), and apply inverse discrete Fourier transforms (IDFTs) (1110), to generate a plurality of symbols, e.g., Sym0, Sym1, Sym2, and Sym3, including information regarding the first 8 bits. The target UE may additionally generate symbols including demodulation reference signals (DM-RS) by applying CS codes CS2, CS3, and CS4 (1114) and IDFTs (1116) to a ZC base sequence. Accordingly, the target UE may transmit the discovery signal, including the symbols corresponding to the first 8 bits and the reference symbols DM-RS, in a first time slot on the PUCCH. Similarly, the target UE may transmit the discovery signal, including symbols corresponding to the last 8 bits and the reference symbols DM-RS, in a second time slot on the PUCCH. In some approaches, the target UE may transmit a discovery signal using a subset of the elements in FIG. 11, e.g., based on the number of symbols included in a resource block.

In example approaches, a pseudo semi-static approach may be used for multiple UEs to transmit their respective discovery signals, to reduce overhead due to dynamic allocation and to efficiently utilize resource blocks. In one example approach, based on the pseudo semi-static approach, a periodicity, a transmission duration, and a time offset to transmit discovery signals from a current subframe may be transmitted to the UEs on the PDCCH or on the PDSCH. Furthermore, additional information may be transmitted on the PDCCH or on the PDSCH to stop periodic discovery signal transmission from the UEs. In one example approach, when multiple UEs are scheduled via the PDSCH, the UEs are divided into a plurality of groups based on the multiplexing capability of the assigned PUSCH, and the discovery signals from each group are transmitted on the assigned PUSCH.

The devices and methods described above may be implemented by any hardware, software or a combination of hardware and software having the above described functions. The software code, either in its entirety or a part thereof, may be stored in a computer readable memory, which may be a tangible, non-transitory computer readable memory.

While several implementations have been provided in the present disclosure, it should be understood that the disclosed devices and methods may be implemented in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented. Method steps may be implemented in an order that differs from that presented herein.

Also, techniques, systems, subsystems, and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure. Although certain illustrated examples in this disclosure may show only two UEs, the described systems and methods for the inter-device communications can be applied to more than two UEs without departing from the scope of the present disclosure.

What is claimed is:

1. A method for use in a first user equipment (UE), comprising:
    receiving, from a base station, control information and a first resource assignment assigning a resource for uplink transmission;
    transmitting, based on the control information, a discovery signal on the assigned resource for uplink transmission, the discovery signal including a first temporary UE identifier (ID) assigned to the first UE, wherein the first temporary UE ID is used to identify the first UE for device-to-device communication;
    receiving, from the base station, a second temporary UE ID assigned to a second UE;
    receiving, from the base station, an announcement message notifying the first UE of a second resource assignment assigning a resource for the second UE for uplink transmission;
    detecting the second temporary UE ID on the assigned resource for the second UE for uplink transmission;
    transmitting, to the base station, a reporting message reporting the second temporary UE ID being detected; and
    performing device-to-device communication with the second UE.

2. The method of claim 1, further comprising: before receiving the control information and the first resource assignment:
    transmitting, to the base station, an indication message indicating the first UE's capability of performing proximity discovery; and
    receiving, from the base station, the first temporary UE ID.

3. The method of claim 1, wherein receiving the control information and the resource assignment comprises:
    receiving, on a physical downlink control channel (PDCCH), the control information and the first resource assignment for uplink transmission.

4. The method of claim 1, wherein receiving the control information and the first resource assignment comprises:
    receiving, on a physical downlink control channel (PDCCH), a resource assignment for a physical downlink shared channel (PDSCH); and
    receiving, on the PDSCH, the control information and the first resource assignment for uplink transmission.

5. The method of claim 1, wherein transmitting the discovery signal comprises: transmitting the discovery signal on a physical uplink shared channel (PUSCH), based on the first resource assignment for uplink transmission.

6. The method of claim 5, further comprising:
    encoding the first temporary UE ID with one of a tail-biting convolutional code or a turbo code to generate the discovery signal.

7. The method of claim 1, wherein transmitting the discovery signal comprises: transmitting the discovery signal on a physical uplink control channel (PUCCH), based on first the resource assignment for uplink transmission.

8. The method of claim 7, further comprising:
    encoding the first temporary UE ID with one of a convolutional code or a Reed-Muller code to generate the discovery signal.

9. User equipment (UE) for performing device-to-device communication, comprising:
    a processor; and
    a memory for storing instructions executable by the processor, wherein the processor is configured to:
        receive, from a base station, control information and a first resource assignment assigning a resource for uplink transmission;
        transmit, based on the control information, a discovery signal on the assigned resource for uplink transmission, the discovery signal including a temporary UE identifier (ID) assigned to the UE, wherein the temporary UE identifier ID is used to identify the UE for device-to-device communication;
        receive, from the base station, a second temporary UE ID assigned to a second UE;
        receive, from the base station, an announcement message notifying the UE of a second resource assignment assigning a resource for the second UE for uplink transmission;
        detect the second temporary UE ID on the assigned resource for the second UE for uplink transmission;
        transmit, to the base station, a reporting message reporting the second temporary UE ID being detected; and
        perform device-to-device communication with the second UE.

10. A method for use in a base station, comprising:
    assigning a first temporary user equipment (UE) identifier (ID) and a second temporary UE ID to a first UE and a second UE, respectively;
    transmitting, to the first UE, control information and a resource assignment for uplink transmission;
    transmitting, to the second UE, an announcement message to notify the second UE of the resource assignment;
    receiving, from the second UE, a reporting message reporting the first temporary UE ID being detected; and
    transmitting, to the first UE, the second temporary UE ID assigned to the second UE.

11. The method of claim 10, wherein assigning the first temporary UE ID and the second temporary UE ID comprises:
    receiving a first indication message from the first UE, the first indication message indicating the first UE's capability of performing device-to-device communication;
    assigning, in response to receiving the first indication message, the first temporary UE ID to the first UE;
    receiving a second indication message from the second UE, the second indication message indicating the second UE's capability of performing device-to-device communication; and assigning, in response to receiving the second indication message, the second temporary UE ID to the second UE.

12. The method of claim 10, further comprising:
receiving, from the first UE, a request for performing proximity discovery; and
transmitting, in response to receiving the request, the control information the resource assignment for uplink transmission.

13. The method of claim 10, further comprising:
transmitting, on a physical downlink control channel (PDCCH), the control information and the resource assignment for uplink transmission.

14. The method of claim 13, wherein transmitting on the PDCCH the resource assignment comprises:
generating a cyclic redundancy check (CRC) code for a message including the resource assignment for uplink transmission;
scrambling the generated CRC code with a radio network temporary identifier (RNTI) assigned to the first UE; and
transmitting, on the PDCCH, the message with the scrambled CRC code appended thereto.

15. The method of claim 10, further comprising:
transmitting, on a physical downlink control channel (PDCCH), a resource assignment for a physical downlink shared channel (PDSCH); and
transmitting, on the PDSCH, the control information and the resource assignment for uplink transmission.

16. The method of claim 10, wherein transmitting the control information comprises: transmitting a modulation and coding scheme for a discovery signal to be transmitted by the first UE.

17. The method of claim 10, wherein transmitting the control information comprises: transmitting a signal pattern for a discovery signal to be transmitted by the first UE.

18. The method of claim 10, wherein transmitting to the first UE the second temporary UE ID comprises:
authenticating a relationship between the first UE and the second UE; and
upon authentication, transmitting to the first UE the second temporary UE ID assigned to the second UE.

19. A base station in a wireless network, comprising:
a processor; and
a memory storing instructions executable by the processor, wherein the processor is configured to:
assign a first temporary user equipment (UE) identifier (ID) and a second temporary UE ID to a first UE and a second UE, respectively;
transmit, to the first UE, control information and a resource assignment for uplink transmission;
transmit, to the second UE, an announcement message to notify the second UE of the resource assignment;
receive, from the second UE, a reporting message reporting the first temporary UE ID being detected; and
transmit, to the first UE, the second temporary UE ID assigned to the second UE.

20. A non-transitory computer-readable medium including instructions, executable by a processor, to cause a first user equipment (UE) to perform a method, the method comprising:
receiving, from a base station, control information and a first resource assignment assigning a resource for uplink transmission;
transmitting, based on the control information, a discovery signal on the assigned resource for uplink transmission, the discovery signal including a first temporary UE identifier (ID) assigned to the first UE, wherein the first temporary UE ID is used to identify the first UE for device-to-device communication;
receiving, from the base station, a second temporary UE ID assigned to a second UE;
receiving, from the base station, an announcement message notifying the first UE of a second resource assignment assigning a resource for the second UE for uplink transmission;
detecting the second temporary UE ID on the assigned resource for the second UE for uplink transmission;
transmitting, to the base station, a reporting message reporting the second temporary UE ID being detected; and
performing device-to-device communication with the second UE.

21. A non-transitory computer-readable medium including instructions, executable by a processor, to cause a base station to perform a method, the method comprising:
assigning a first temporary user equipment (UE) identifier (ID) and a second temporary UE ID to a first UE and a second UE, respectively;
transmitting, to the first UE, control information and a resource assignment for uplink transmission;
transmitting, to the second UE, an announcement message to notify the second UE of the resource assignment;
receiving, from the second UE, a reporting message reporting the first temporary UE ID being detected; and
transmitting, to the first UE, the second temporary UE ID assigned to the second UE.

* * * * *